US 9,945,342 B2

(12) United States Patent
Kinoshita

(10) Patent No.: US 9,945,342 B2
(45) Date of Patent: Apr. 17, 2018

(54) VEHICLE CONTROL APPARATUS

(71) Applicant: SUBARU CORPORATION, Tokyo (JP)

(72) Inventor: Takahiro Kinoshita, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 42 days.

(21) Appl. No.: 15/066,807

(22) Filed: Mar. 10, 2016

(65) Prior Publication Data
US 2016/0290305 A1 Oct. 6, 2016

(30) Foreign Application Priority Data

Mar. 31, 2015 (JP) .................................. 2015-073430

(51) Int. Cl.
G06F 19/00 (2011.01)
F02N 11/08 (2006.01)
(Continued)

(52) U.S. Cl.
CPC ........ F02N 11/0866 (2013.01); F02N 11/006 (2013.01); F02N 11/04 (2013.01); F02N 11/087 (2013.01); F02N 15/08 (2013.01)

(58) Field of Classification Search
CPC .. F02N 11/0866; F02N 11/006; F02N 11/087; F02N 15/08; F02N 11/0825; F02N 11/0844; F02N 11/0855
(Continued)

(56) References Cited

U.S. PATENT DOCUMENTS 6,321,707 B1 * 11/2001 Dunn .................. F02N 11/0866
123/179.3
6,802,291 B2 * 10/2004 Ujifusa ............... F02N 11/0814
123/179.4
(Continued)

FOREIGN PATENT DOCUMENTS

JP 2000-145493 A 5/2000
JP 2004-003434 A 1/2004
(Continued)

OTHER PUBLICATIONS

Decision to Grant issued in corresponding Japanese Patent Application No. 2015-073430, dated Oct. 18, 2016.
(Continued)

Primary Examiner — Hung Q Nguyen
Assistant Examiner — Anthony Taylor, Jr.
(74) Attorney, Agent, or Firm — McDermott Will & Emery LLP

(57) ABSTRACT

A vehicle control apparatus mounted on a vehicle includes: a first starting system provided with a first electric motor coupled to an engine, and a first power storage coupled to the first electric motor; a second starting system provided with a second electric motor coupled to the engine, and a second power storage coupled to the second electric motor; and an engine controller that stops the engine based on a stop condition and restarts the engine using the first starting system, based on a start condition. When an abnormality occurs in the first starting system in a state where the engine has been stopped based on the stop condition, the engine controller restarts the engine using the second starting system.

6 Claims, 14 Drawing Sheets

(51) Int. Cl.
*F02N 11/00* (2006.01)
*F02N 11/04* (2006.01)
*F02N 15/08* (2006.01)

(58) Field of Classification Search
USPC .......................................................... 701/113
See application file for complete search history.

(56) References Cited

U.S. PATENT DOCUMENTS

| | | | | |
|---|---|---|---|---|
| 8,575,883 | B2* | 11/2013 | Sone | B60L 11/1868 |
| | | | | 307/9.1 |
| 8,577,575 | B2* | 11/2013 | Tomura | B60W 10/06 |
| | | | | 180/337 |
| 8,700,243 | B2* | 4/2014 | Kamijo | F02N 11/0844 |
| | | | | 180/65.265 |
| 9,030,165 | B2* | 5/2015 | Kawai | B60R 16/033 |
| | | | | 320/108 |
| 9,086,043 | B2* | 7/2015 | Kanemoto | F02N 11/0825 |
| 9,431,850 | B2* | 8/2016 | Imai | H02J 7/1423 |
| 2003/0041830 | A1* | 3/2003 | Sugiura | F02D 11/105 |
| | | | | 123/179.4 |
| 2012/0037438 | A1* | 2/2012 | Schultz | B60K 6/28 |
| | | | | 180/65.22 |
| 2012/0109502 | A1* | 5/2012 | Ishikawa | F02D 17/00 |
| | | | | 701/112 |

FOREIGN PATENT DOCUMENTS

| | | | | |
|---|---|---|---|---|
| JP | 2004003434 A | * | 1/2004 | ............ F02N 11/006 |
| JP | 2004-324446 A | | 11/2004 | |
| JP | 2006-322369 A | | 11/2006 | |
| JP | 2012-111267 A | | 6/2012 | |
| JP | 2014-036557 A | | 2/2014 | |

OTHER PUBLICATIONS

Japanese Office Action dated May 10, 2016, issued in Japanese Application No. 2015-073430. (w/ English translation).

* cited by examiner

VEHICLE CONTROL APPARATUS

CROSS-REFERENCE TO RELATED APPLICATIONS

The present application claims priority from Japanese Patent Application No. 2015-073430 filed on Mar. 31, 2015, the entire contents of which are hereby incorporated by reference.

BACKGROUND

1. Technical Field

The technology relates to a vehicle control apparatus that may be mounted on a vehicle.

2. Related Art

A vehicle which stops an engine based on prescribed stop condition and restarts the engine based on prescribed starting conditions has been disclosed (see Japanese Unexamined Patent Application Publication (JP-A) No. 2014-36557). In the vehicle disclosed in JP-A No. 2014-36557, when an engine is stopped based on stop condition, an alternator is caused to generate power and charge a lithium ion battery and a lead battery. On the other hand, when the engine is restarted based on the starting conditions, the starter is made to perform a starting rotation by power from the lead battery.

SUMMARY OF THE INVENTION

When the starting conditions are established and the engine is restarted, if an abnormality has occurred in the start-up system, such as the starter, battery and controller, etc., then it is difficult to restart the engine. Nevertheless, even if there is an abnormality in the start-up system, there is a requirement for the engine to be restarted with a view to ensure minimum travel performance.

It is desirable to restart an engine even if there is an abnormality with the start-up system.

An aspect of the technology provides a vehicle control apparatus mounted on a vehicle. The vehicle control apparatus includes: a first starting system provided with a first electric motor coupled to an engine, and a first power storage coupled to the first electric motor; a second starting system provided with a second electric motor connected to the engine, and a second power storage coupled to the second electric motor; and an engine controller that stops the engine based on a stop condition and restarts the engine using the first starting system, based on a start condition. When an abnormality occurs in the first starting system in a state where the engine has been stopped based on the stop condition, the engine controller restarts the engine using the second starting system.

DETAILED DESCRIPTION

Figure 1:
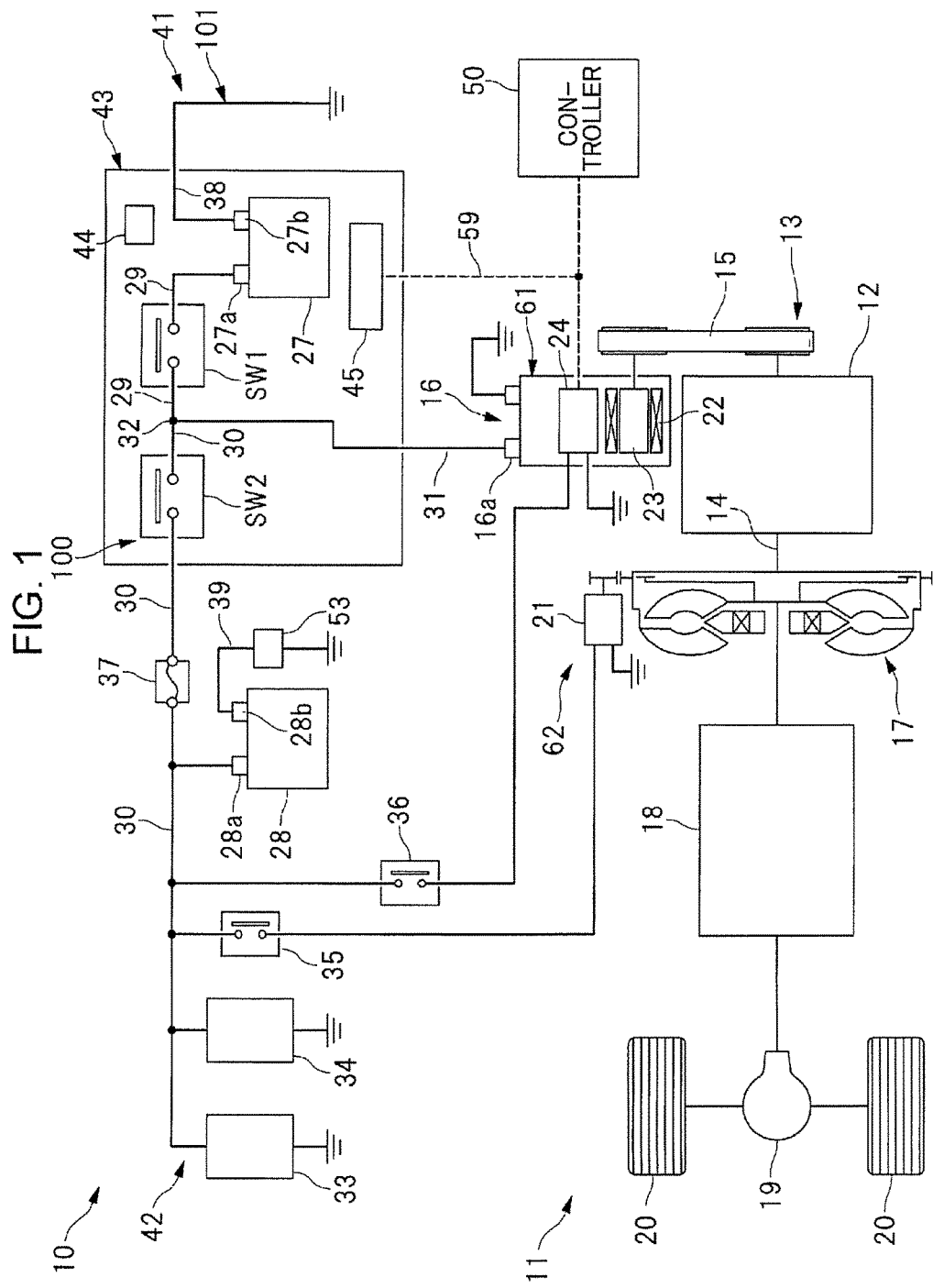
FIG. 1 schematically illustrates a configuration example of a vehicle including a vehicle control apparatus according to an implementation of the technology.

In the following, some implementations of the technology are described in detail with reference to the drawings. FIG. 1 schematically illustrates a configuration example of a vehicle 11 including a vehicle control apparatus 10 according to an implementation of the technology. Referring to FIG. 1, the vehicle 11 may include a power unit 13 having an engine 12. The engine 12 may include a crank shaft 14 to which a motor generator 16 may be coupled through a belt mechanism 15. Thus, the motor generator 16 is mechanically coupled to the engine 12. In one embodiment of the technology, the motor generator 16 may serve as a "first electric motor". A transmission mechanism 18 may be also coupled to the engine 12 through a torque converter 17. One or more wheels 20 may be coupled to the transmission mechanism 18 through a differential mechanism 19 or other parts. The power unit 13 may further include a starter motor 21 that causes starting revolution of the crank shaft 14. Thus, the engine 12 is mechanically coupled to the starter motor 21. In one embodiment of the technology, the starter motor 21 may serve as a "second electric motor".

The motor generator 16 may be a so-called ISG (integrated starter generator). Not only may the motor generator 16 serve as a generator that is driven by the crank shaft 14 to generate power, the motor generator 16 may also serve as an electric motor that causes the starting revolution of the crank shaft 14. The motor generator 16 may include a stator 22 and a rotor 23; the stator 22 may include a stator coil, and the rotor 23 may include a field coil. The motor generator 16 may further include an ISG controller 24, in order to control energized states of the stator coil and the field coil. The ISG controller 24 may include an inverter, a regulator, a microcomputer, and other parts. A sensor 24a may be coupled to the ISG controller 24a. The sensor 24a detects a generated voltage and a generated current of the motor generator 16.

In allowing the motor generator 16 to serve as a generator, the energized state of the field coil may be controlled by the ISG controller 24. Controlling the energized state of the field coil makes it possible to control the generated voltage of the motor generator 16. In allowing the motor generator 16 to be driven to generate power, controlling the inverter of the ISG controller 24 makes it possible to control the generated current of the motor generator 16. In allowing the motor generator 16 to serve as an electric motor, the energized state of the stator coil may be controlled by the ISG controller 24. Note that the ISG controller 24 may control the energized states of the field coil and the stator coil, based on a control signal from a control unit 50, as described later.

Figure 2:
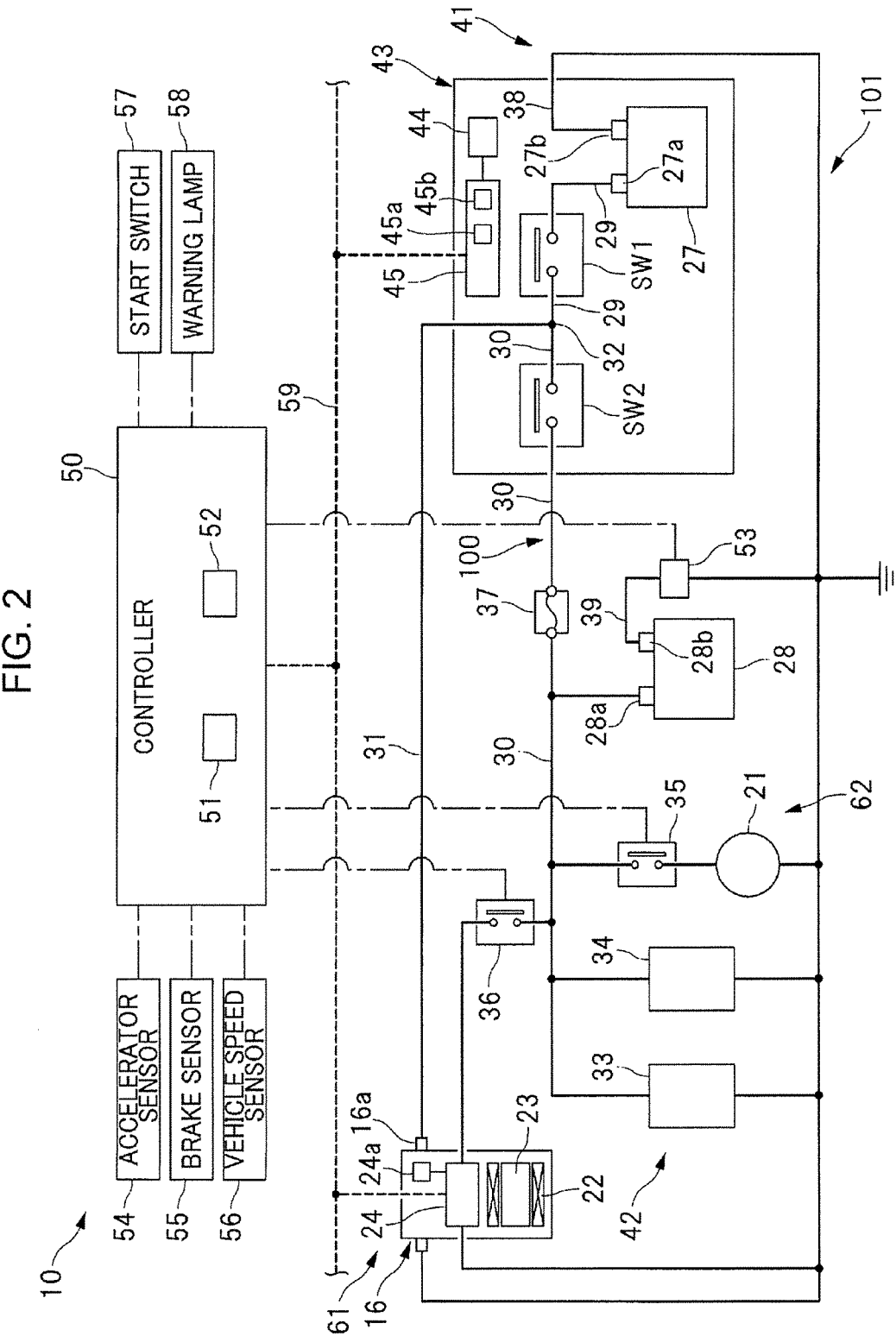
FIG. 2 is a block diagram of a configuration example of the vehicle control apparatus.
Figure 3:
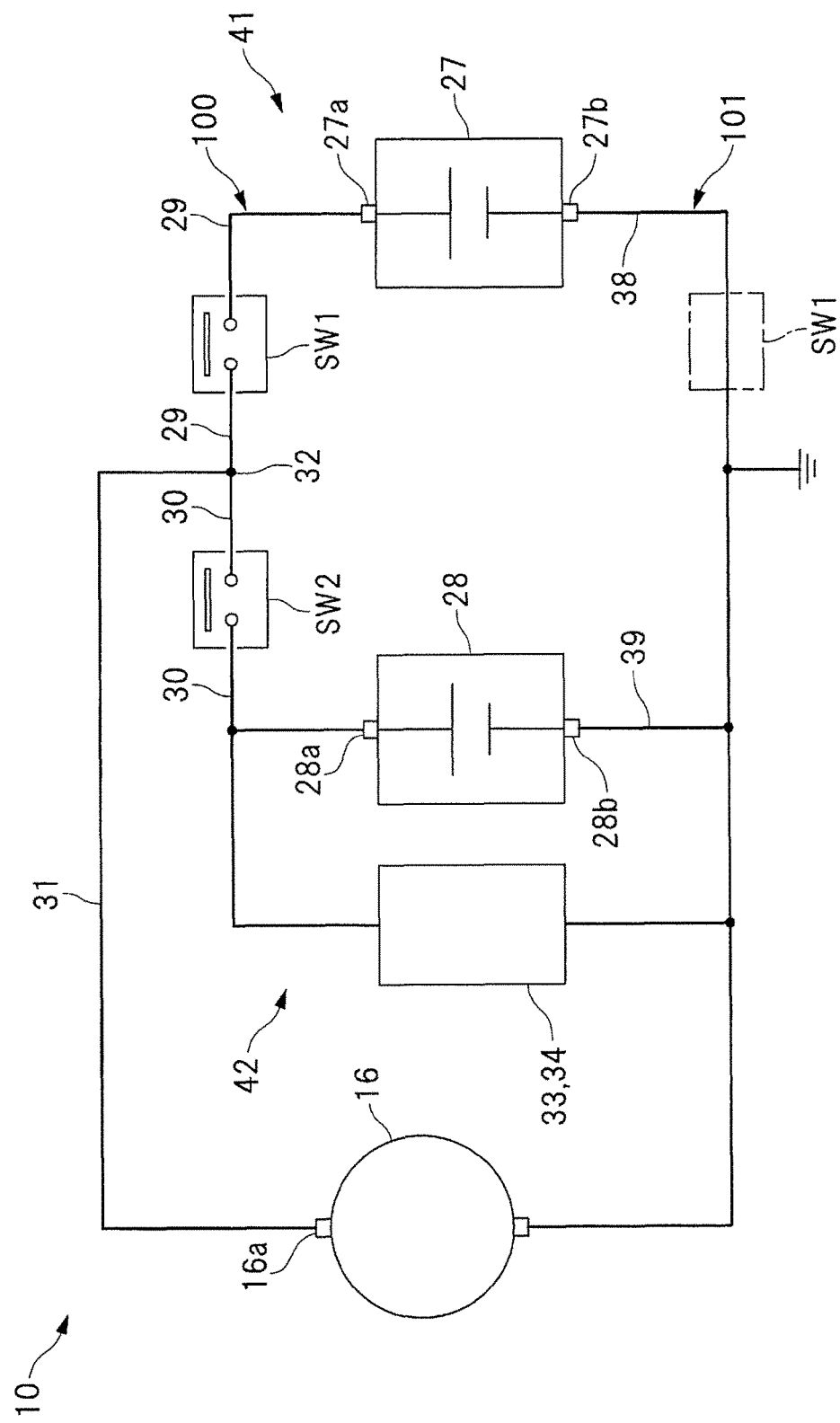
FIG. 3 is a simplified circuit diagram of a configuration of the vehicle control apparatus.

Description is given next of a configuration of the vehicle control apparatus 10. FIG. 2 is a block diagram of a configuration example of the vehicle control apparatus 10. FIG. 3 is a simplified circuit diagram of a configuration of the vehicle power source 10. Referring to FIGS. 1 to 3, the vehicle control apparatus 10 includes a lithium ion battery 27 and a lead battery 28. In one implementation of the technology, the lithium ion battery 27 may serve as a "first power storage", and the lead battery 28 may serve as a "second power storage". The lithium ion battery 27 is coupled to the motor generator 16. The lead battery 28 is coupled, in parallel with the lithium ion battery 27, to the motor generator 16. A first power line 29 is coupled to a positive electrode terminal 27a of the lithium ion battery 27. A second power line 30 is coupled to a positive electrode terminal 28a of the lead battery 28. Moreover, the motor generator 16 includes an output terminal 16a that outputs the generated current of the motor generator 16. A charge line 31 is coupled to the output terminal 16a. The first power line 29, the second power line 30, and the charge line 31 are coupled to one another through a node 32. In other words, the first power line 29, the second power line 30, and the charge line 31 may constitute a conduction path 100; the positive electrode terminals 27a and 28a of the lithium ion battery 27 and the lead battery 28 may be coupled to each other through the conduction path 100.

The first power line 29, which constitutes the conduction path 100, may be provided with an ON/OFF switch SW1. The second power line 30 may be provided with an ON/OFF switch SW2. Note that the ON/OFF switch SW2 may be inserted between the positive electrode terminal 28a and the node 32 in the second power line 30. The ON/OFF switches SW1 and SW2 each may operate in a closed state or a conductive state (i.e., an ON state) and in an open state or a cut-off state (i.e., an OFF state). In other words, the ON/OFF switch SW1 is switched between the conductive state and the cut-off state; the conductive state involves electrical coupling of the motor generator 16 to the lithium ion battery 27; and the cut-off state involves electrical separation of the motor generator 16 from the lithium ion battery 27. Similarly, the ON/OFF switch SW2 is switched between the conductive state and the cut-off state; the conductive state involves electrical coupling of the motor generator 16 to the lead battery 28; and the cut-off state involves electrical separation of the motor generator 16 from the lead battery 28.

A momentary voltage drop protection load 33 and a vehicle body load 34, etc. are connected to the second power source line 30. Furthermore, a starter motor 21 is connected to the second power source line 30 via the starter relay 35, and the ISG controller 24 is connected via an ISG relay 36. Moreover, the momentary voltage drop protection load 33, the vehicle body load 34, and a fuse 37 which protects the starter motor 21 and the ISG controller 24, and the like, are provided in the second power source line 30. In the illustrated example, an on/off switch SW1 is provided in the first power source line 29, but this is not limiting. As indicated by the single-dotted line in FIG. 3, an on/off switch SW1 may be provided in a conduction line 38 which is connected to a negative electrode terminal 27b of the lithium ion battery 27.

In other words, the negative electrode terminals 27b and 28b of the lithium ion battery 27 and the lead battery 28 are connected via a conduction path 101 including the conduction lines 38 and 39. An on/off switch SW1 may be provided in the conduction line 38 constituting the conduction path 101. If the on/off switch SW1 is provided in the conduction line 38, the on/off switch SW1 is switched between a conducting state where the motor-generator 16 and the lithium ion battery 27 are electrically connected, and a cut-off state where the motor-generator 16 and the lithium ion battery 27 are electrically separated. Even in the case where the on/off switch SW1 is be provided in the conduction line 38 constituting the conduction path 101, the ON/OFF switch SW1 is switched between the conductive state and the cut-off state.

As illustrated in FIGS. 1 and 2, the vehicle control apparatus 10 may include a first power circuit 41 that includes the lithium ion battery 27 and the motor generator 16. The vehicle control apparatus 10 may also include a second power circuit 42 that includes components such as, but not limited to, the lead battery 28, the instantaneous voltage drop protection load 33, the vehicle body load 34, and the starter motor 21. The first power circuit 41 and the second power circuit 42 may be coupled to each other through the ON/OFF switch SW2. Furthermore, the vehicle control apparatus 10 may include a battery module 43. In the battery module 43, the lithium ion battery 27 and the ON/OFF switches SW1 and SW2 may be incorporated.

The battery module 43 may include a battery sensor 44 that detects a state of charge, charge and discharge currents, a terminal voltage, temperature, and other characteristics of the lithium ion battery 27. Moreover, the battery module 43 may include a battery controller 45 that includes, for example, a drive circuit and a microcomputer. The battery controller 45 may include a drive circuit 45a and a drive circuit 45b. The drive circuit 45a may generate a control current of the ON/OFF switch SW1. The drive circuit 45b may generate a control current of the ON/OFF switch SW2. The battery controller 45 may control the ON/OFF switches SW1 and SW2, based on control signals from the control unit 50, as described later. Also, the battery controller 45 may open the ON/OFF switch SW1 to separate the lithium ion battery 27 from the vehicle control apparatus 10, when excessive charge and discharge currents or an increase in temperature of the lithium ion battery 27 is detected. Note that, though not illustrated, the battery controller 45 may be coupled to the second power line 30, similarly to the ISG controller 24 as mentioned above.

As mentioned above, the instantaneous voltage drop protection load 33 may be coupled to the second power line 30. The instantaneous voltage drop protection load 33 is an electrical device that ought to be kept in operation during engine restart in idling stop control, as described later. Non-limiting examples of the instantaneous voltage drop protection load 33 may include engine auxiliaries, a brake actuator, a power steering actuator, an instrumental panel, and various electronic control units. Also, the vehicle body load 34 may be coupled to the second power line 30. The vehicle body load 34 is an electrical device whose instantaneous shut-down is allowed during the engine restart in the idling stop control. Non-limiting examples of the vehicle body load 34 may include a door mirror motor, a power window motor, and a radiator fan motor.

As illustrated in FIG. 2, the vehicle control apparatus 10 may include a control unit 50 that controls the motor generator 16, the battery module 43, and other parts. The control unit 50 may include a charge and discharge controller 51 that controls charge and discharge of the lithium ion battery 27. The charge and discharge controller 51 may determine, based on input signals from other controllers or sensors, the state of charge of the lithium ion battery 27, operation states of an accelerator pedal and a brake pedal, and other states. Based on the state of charge of the lithium ion battery 27, and other states, the charge and discharge controller 51 may control a state of power generation of the motor generator 16, to control charge and discharge of the lithium ion battery 27. Note that the charge and discharge controller 51 may include, for example, a microcomputer and a drive circuit. The microcomputer may include a CPU, ROM, RAM, and other components. The drive circuit may generate control currents of various actuators.

The control unit 50 may include an ISS controller 52 that executes the idling stop control. In one implementation of the technology, the ISS controller 52 may serve as an "engine controller". The idling stop control is control that involves automatically stopping the engine 12 based on a predetermined condition and automatically restarting the engine 12 based on a predetermined condition. The ISS controller 52 may determine, based on input signals from other controllers or sensors, a stop condition and a start condition of the engine 12. The ISS controller 52 may automatically stop the engine 12 when the stop condition is established, and may automatically restart the engine 12 when the start condition is established. A non-limiting example of the stop condition of the engine 12 may be that a vehicle speed is equal to or lower than a predetermined vehicle speed and the brake pedal is stepped down. Non-limiting examples of the start condition of the engine 12 may include that stepping down of the brake pedal is released, and that the accelerator pedal is stepped down. Note that the ISS controller 52 may include, for example, a microcomputer and a drive circuit. The microcomputer may include a CPU, ROM, RAM, and other components. The drive circuit may generate control currents of various actuators. The term "ISS" for the ISS controller 52 is an abbreviation of "idling stop system".

The control unit 50 may be coupled to sensors such as, but not limited to, a battery sensor 53, an accelerator sensor 54, and a brake sensor 55. The battery sensor 53 detects charge and discharge currents, a state of charge, and other characteristics of the lead battery 28. The accelerator sensor 54 detects an amount of stepping down of the accelerator pedal. The brake sensor 55 detects an amount of stepping down of the brake pedal. The control unit 50 may be also coupled to other sensors such as, but not limited to, a vehicle speed sensor 56 and a start switch 57. The vehicle speed sensor 56d detects a vehicle speed, i.e. a traveling speed of the vehicle 11. The start switch 58 is manually operated by an occupant at engine start. Furthermore, the control unit 50 may be coupled to a warning lamp 58 that informs an occupant of abnormality of the vehicle control apparatus 10.

The control unit 50, the motor generator 16, the battery module 43, and other parts may be coupled to one another through an on-vehicle network 59 such as, but not limited to, CAN and LIN. Specifically, the ISG controller 24, the battery controller 45, the charge and discharge controller 51, the ISS controller 52, and various sensors may be coupled communicably through the on-vehicle network 59. Through the on-vehicle network 59, the control unit 50 may receive, from the ISG controller 24, the generated voltage, the generated current, and other characteristics of the motor generator 16, and may receive, from the battery controller 45, the state of charge, the discharge current, and other characteristics of the lithium ion battery 27. The control unit 50 may determine an operation state of the vehicle power source 10 and a traveling state of the vehicle 11, and may output a control signal to the ISG controller 24 and the battery controller 45.

[Voltage Characteristics of Batteries]

Figure 4:
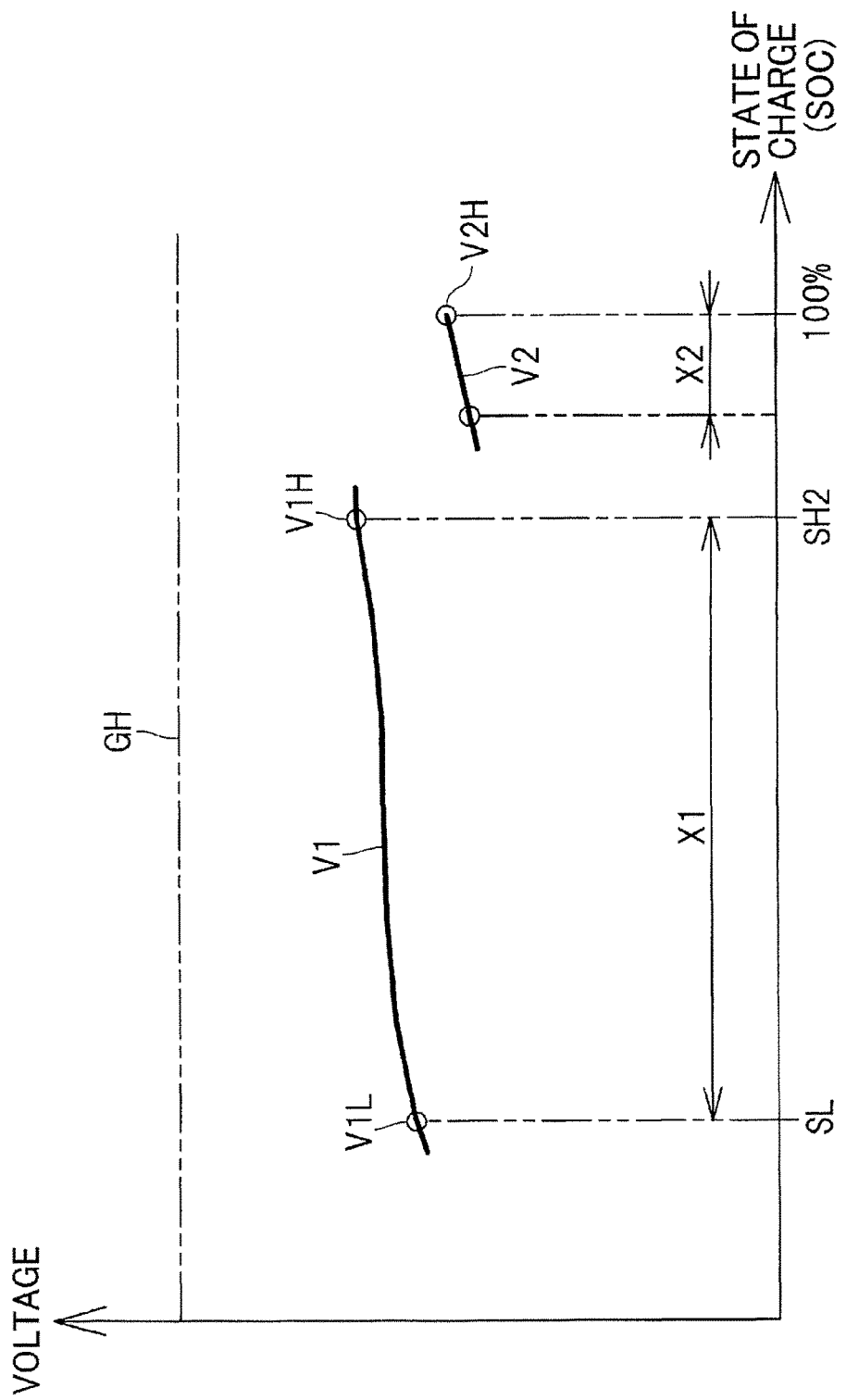
FIG. 4 is a diagram of relations between terminal voltages and states of charge in batteries.

Description is given next of voltage characteristics of the lithium ion battery 27 and the lead battery 28. FIG. 4 is a diagram of relations between terminal voltages and the states of charge SOC in the batteries. Note that a state of charge SOC is a value that indicates a degree of charge of a battery, or a ratio of remaining capacity to design capacity of a battery. In FIG. 4, terminal voltages V1 and V2 indicate battery voltages with no current flowing therethrough, i.e., an open end voltage. Also, in FIG. 4, a reference GH indicates a maximum generated voltage of the motor generator 16.

Referring to FIG. 4, the terminal voltage V1 of the lithium ion battery 27 may be set higher than the terminal voltage V2 of the lead battery 28. In other words, a lower limit voltage V1L of a charge and discharge range X1 of the lithium ion battery 27 may be set higher than an upper limit voltage V2H of a charge and discharge range X2 of the lead battery 28. Moreover, the terminal voltage V1 of the lithium ion battery 27 may be set lower than an upper limit (e.g., 16 V) of a charge voltage of the lead battery 28. In other words, an upper limit voltage V1H of the charge and discharge range X1 of the lithium ion battery 27 may be set lower than the upper limit of the charge voltage of the lead battery 28. This makes it possible to avoid excessive charge of the lead battery 28 by the lithium ion battery 27 even in a case of parallel connection of the lithium ion battery 27 and the lead battery 28, and to avoid deterioration of the lead battery 28. Note that an upper limit of a charge voltage is an upper limit value of a charge voltage, specified for each type of power storage in view of suppression of deterioration of a power storage.

As illustrated in FIG. 4, the lithium ion battery 27 may be provided with the broad charge and discharge range X1, owing to good cycle characteristics of the lithium ion battery 27. In contrast, the lead battery 28 may be provided with the narrow charge and discharge range X2 near full charge, in view of prevention of battery deterioration. Moreover, internal resistance of the lithium ion battery 27 may be set lower than internal resistance of the lead battery 28. In other words, the internal resistance of the lead battery 28 may be set higher than the internal resistance of the lithium ion battery 27.

[Power Generation Control of Motor Generator]

Figure 5:
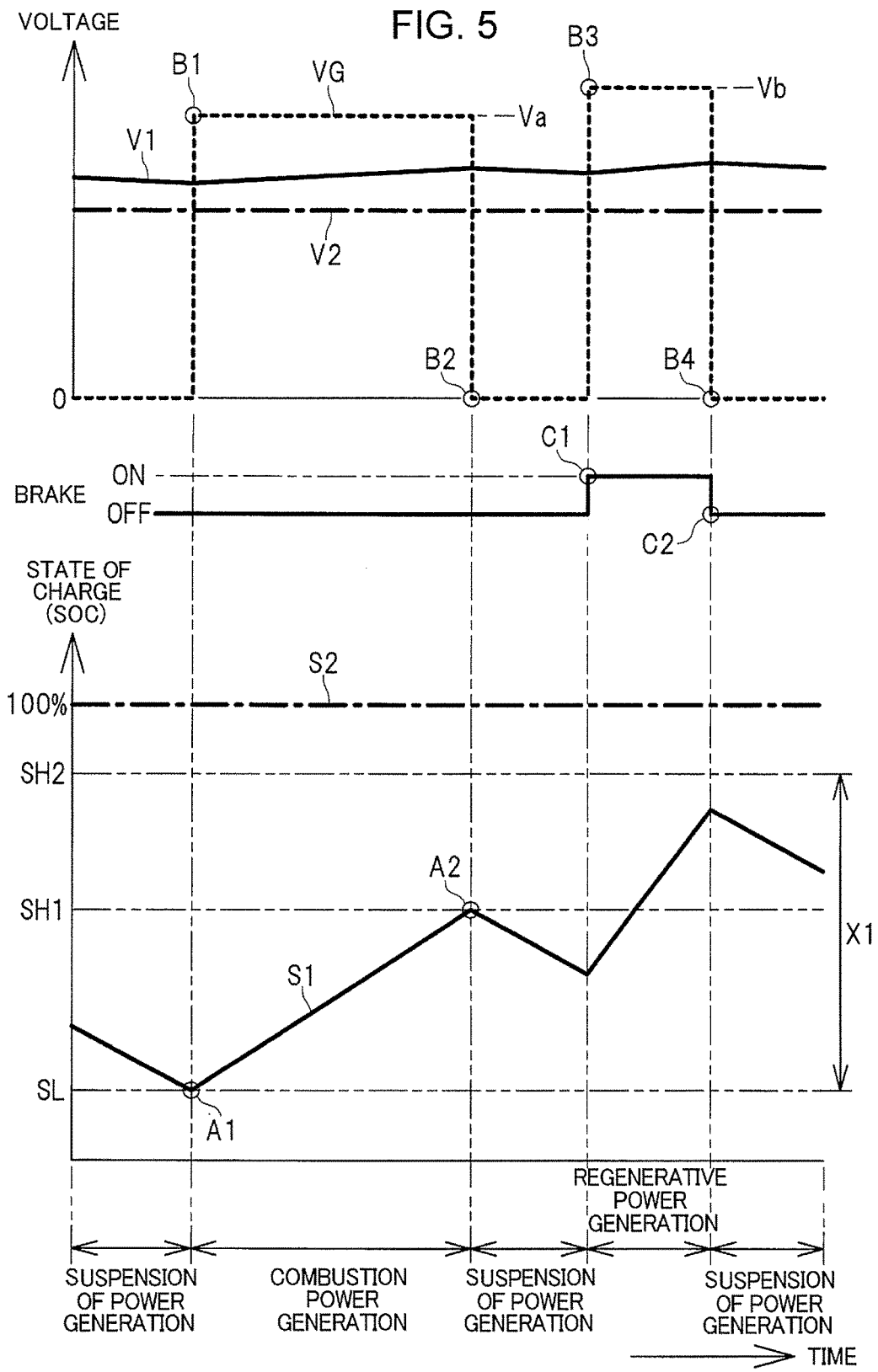
FIG. 5 is a time chart of an example of power generation control of a motor generator.

Description is given next of power generation control of the motor generator 16. FIG. 5 is a time chart of an example of the power generation control of the motor generator 16. FIG. 5 indicates the generated voltage VG of the motor generator 16, the terminal voltage V1 and the state of charge S1 of the lithium ion battery 27, and the terminal voltage V2 and the state of charge S2 of the lead battery 28. In FIG. 5, "brake ON" means that the brake pedal is stepped down, and "brake OFF" means that the stepping down of the brake pedal is released.

Referring to FIG. 5, the state of charge S1 of the lithium ion battery 27 may be controlled within the charge and discharge range X1. For example, when the state of charge S1 of the lithium ion battery 27 is lowered to a lower limit SL in accordance with discharge, the motor generator 16 may be controlled to a power generation state, allowing the lithium ion battery 27 to be charged. Here, the power generation state of the motor generator 16 may include a combustion power generation state and a regenerative power generation state. The combustion power generation state may involve allowing the motor generator 16 to generate power with use of engine power, and converting fuel energy to electric energy. The regenerative power generation state may involve allowing the motor generator 16 to generate power in vehicle deceleration, and converting kinetic energy of the vehicle 11 to electric energy. To improve energy efficiency of the vehicle 11 to enhance fuel consumption performance, it is desirable to facilitate the regenerative power generation state of the motor generator 16 while restraining the combustion power generation state of the motor generator 16, allowing suppression of an amount of fuel consumption of the engine 12. In other words, it is desirable to allow the lithium ion battery 27 to positively store regenerative electric power of the motor generator 16, and to discharge the regenerative electric power from the lithium ion battery 27 to the vehicle body load 34 or other parts, restraining the combustion power generation state of the motor generator 16.

Whether to control the motor generator 16 to the combustion power generation state or not may be determined based on the state of charge S1 of the lithium ion battery 27. Specifically, the charge and discharge controller 51 may control the motor generator 16 to the combustion power generation state when the state of charge S1 is lowered to the lower limit SL. Then, the charge and discharge controller 51 may keep the combustion power generation state of the motor generator 16 until the state of charge S1 reaches a first upper limit SH1. Whether to control the motor generator 16 to the regenerative power generation state or not may be determined based on the operation states of the accelerator pedal and the brake pedal. Specifically, the charge and discharge controller 51 may control the motor generator 16 to the regenerative power generation state, in the vehicle deceleration when the stepping down of the accelerator pedal is released, or in the vehicle deceleration when the brake pedal is stepped down. Then, the charge and discharge controller 51 may cancel the regenerative power generation state of the motor generator 16 in a case of the stepping down of the accelerator pedal, or in a case of the release of the stepping down of the brake pedal, and may control the motor generator 16 to a power generation suspension state. Note that, with the motor generator 16 controlled in the regenerative power generation state, when the state of charge S1 increases to a second upper limit SH2, the regenerative power generation state of the motor generator 16 may be cancelled in order to prevent excessive charge of the lithium ion battery 27; and the motor generator 16 may be controlled to the power generation suspension state.

[Power Supply States of Vehicle Control Apparatus]

Figure 6:
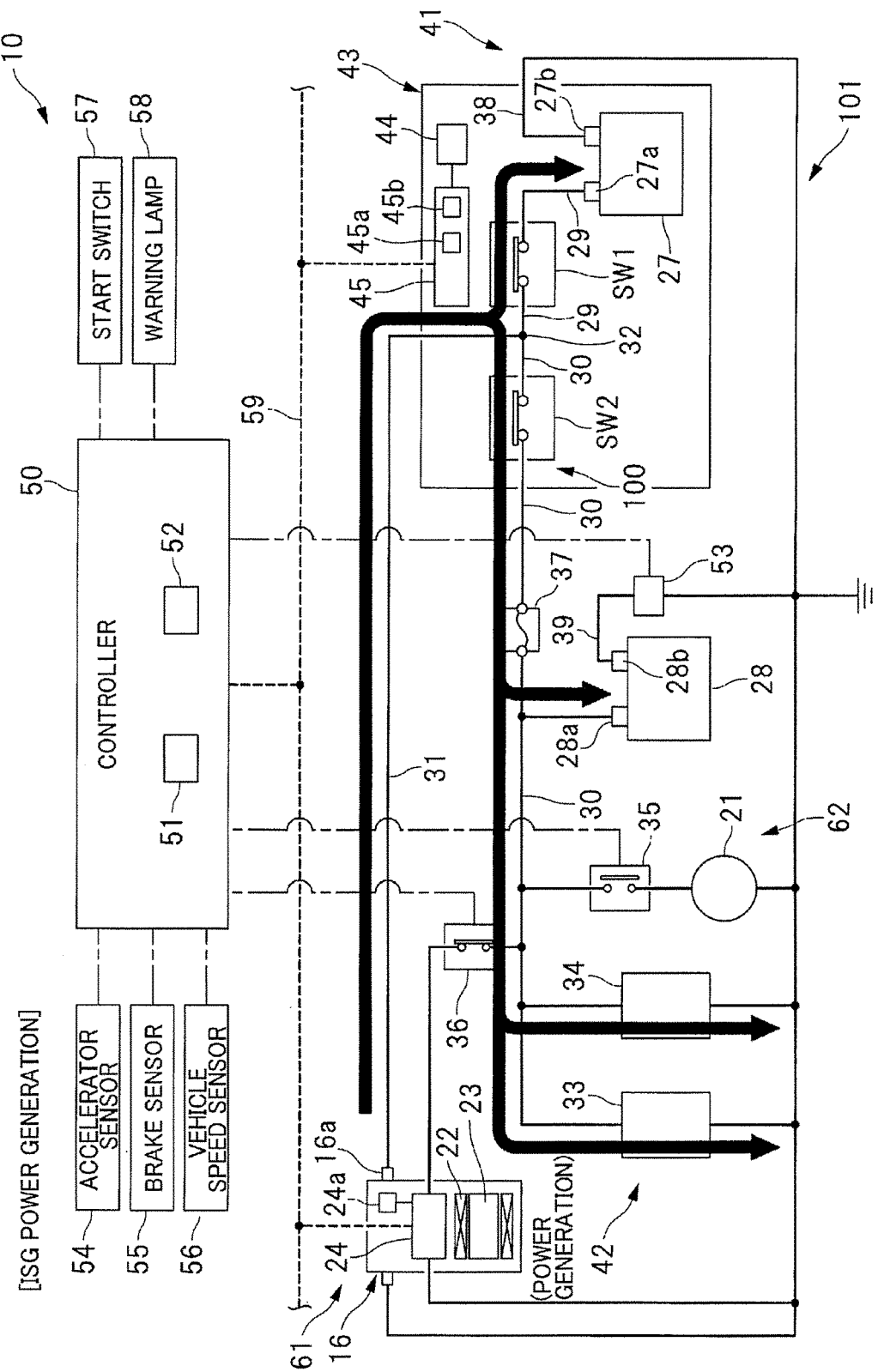
FIG. 6 illustrates a state of power supply of the vehicle control apparatus.
Figure 7:
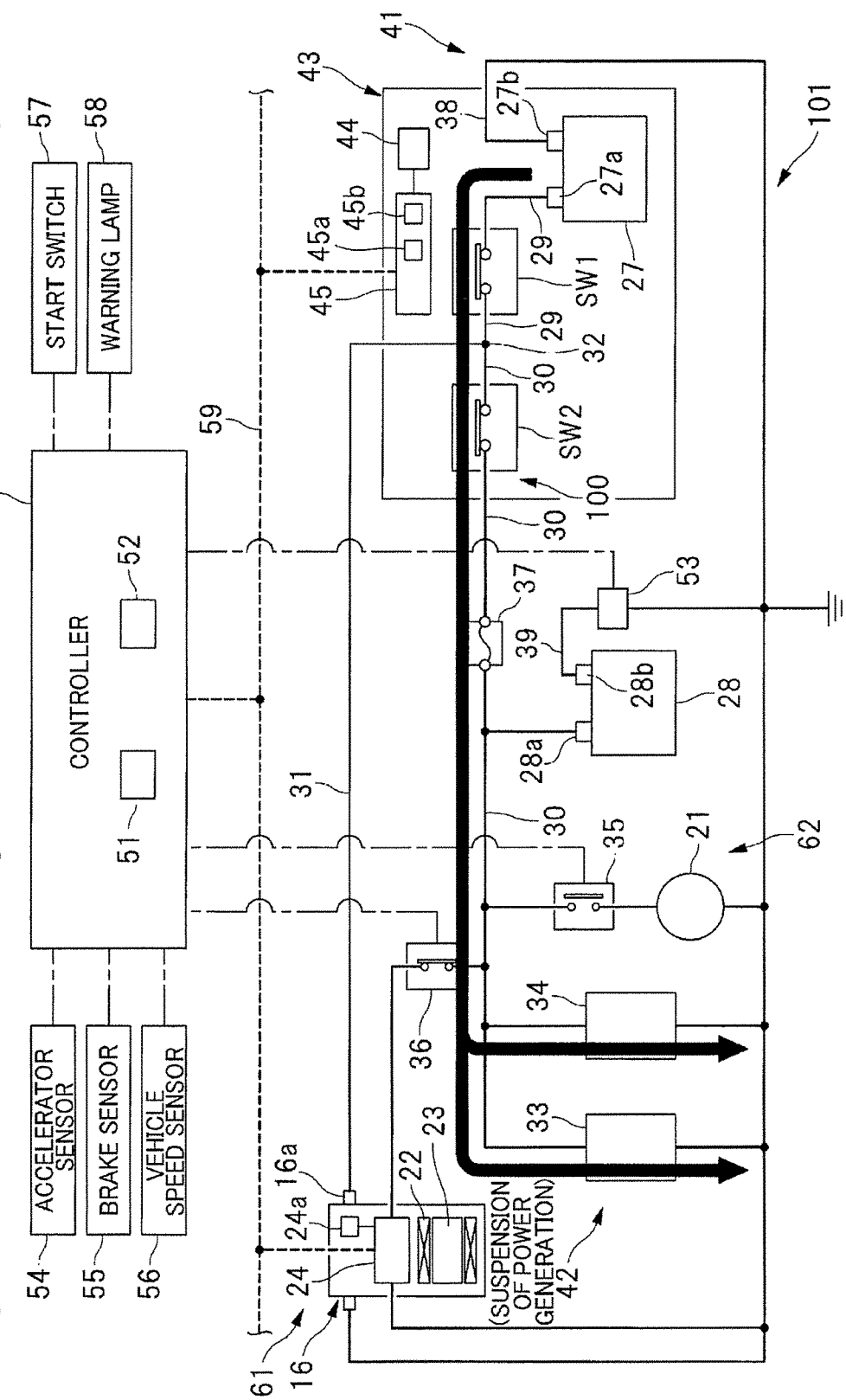
FIG. 7 illustrates a state of power supply of the vehicle control apparatus.

Description is now given of power supply states of the vehicle control apparatus 10. FIGS. 6 and 7 illustrate the power supply states of the vehicle control apparatus 10. FIG. 6 illustrates the power supply state in charging the lithium ion battery. FIG. 7 illustrates the power supply state in discharging the lithium ion battery.

First, as illustrated in FIG. 5, when the state of charge S1 of the lithium ion battery 27 is lowered to the lower limit SL (as denoted by a reference A1), the charge and discharge controller 51 may control the motor generator 16 to the combustion power generation state. In the combustion power generation state, the generated voltage VG of the motor generator 16 may be raised to a predetermined voltage Va higher than the terminal voltage V1 of the lithium ion battery 27 (as denoted by a reference B1). Here, referring to FIG. 6, in raising the generated voltage VG of the motor generator 16 above the terminal voltage V1 of the lithium ion battery 27, the ON/OFF switches SW1 and SW2 in the battery module 43 may be kept in the closed state. Thus, as denoted by an arrow in FIG. 6, the generated power of the motor generator 16 may be supplied to the lithium ion battery 27, the lead battery 28, the instantaneous voltage drop protection load 33, and the vehicle body load 34.

Controlling the motor generator 16 to the combustion power generation state as described may cause the lithium ion battery 27 to be charged, allowing the state of charge S1 of the lithium ion battery 27 to increase gradually. As illustrated in FIG. 5, when the state of charge S1 reaches the first upper limit SH1 (as denoted by a reference A2), the charge and discharge controller 51 may control the motor generator 16 to the power generation suspension state. In the power generation suspension state, the generated voltage VG of the motor generator 16 may be lowered to "zero" lower than the terminal voltage V1 of the lithium ion battery 27 (as denoted by a reference B2). Here, referring to FIG. 7, in lowering the generated voltage VG of the motor generator 16 below the terminal voltage V1 of the lithium ion battery 27, the ON/OFF switches SW1 and SW2 in the battery module 43 may be kept in the closed state. Thus, as denoted by an arrow in FIG. 7, the electric power stored in the lithium ion battery 27 may be supplied to the instantaneous voltage drop protection load 33 and the vehicle body load 34, and discharge of the lead battery 28 may be suppressed. Basically, the electric power stored in the lead battery 28 may also be supplied to the instantaneous voltage drop protection load 33 and the vehicle body load 34. When the state of charge of the lead battery 28 is lowered, the electric power stored in the lithium ion battery 27 may be supplied also to the lead battery 28.

Next, as illustrated in FIG. 5, when the brake pedal is stepped down (as denoted by a reference C1), the charge and discharge controller 51 may control the motor generator 16 to the regenerative power generation state. In the regenerative power generation state, the generated voltage VG of the motor generator 16 may be raised to a predetermined voltage Vb higher than the terminal voltage V1 of the lithium ion battery 27 (as denoted by a reference B3). Here, as illustrated in FIG. 6, in raising the generated voltage VG of the motor generator 16 above the terminal voltage V1 of the lithium ion battery 27, the ON/OFF switches SW1 and SW2 in the battery module 43 may be kept in the closed state. Thus, as denoted by an arrow in FIG. 6, the generated power of the motor generator 16 may be supplied to the lithium ion battery 27, the lead battery 28, the instantaneous voltage drop protection load 33, and the vehicle body load 34.

Thereafter, as illustrated in FIG. 5, when the stepping down of the brake pedal is released (as denoted by a reference C2), the charge and discharge controller 51 may control the motor generator 16 to the power generation suspension state. In the power generation suspension state, the generated voltage VG of the motor generator 16 may be lowered to "zero" lower than the terminal voltage V1 of the lithium ion battery 27 (as denoted by a reference B4). Here, as illustrated in FIG. 7, in lowering the generated voltage VG of the motor generator 16 below the terminal voltage V1 of the lithium ion battery 27, the ON/OFF switches SW1 and SW2 in the battery module 43 may be kept in the closed state. Thus, as denoted by an arrow in FIG. 7, the electric power stored in the lithium ion battery 27 may be supplied to the instantaneous voltage drop protection load 33 and the vehicle body load 34. When the state of charge of the lead battery 28 is lowered, the electric power stored in the lithium ion battery 27 may be supplied also to the lead battery 28.

As described so far, controlling the generated voltage VG of the motor generator 16 makes it possible to control charge and discharge of the lithium ion battery 27. Specifically, raising the generated voltage VG above the terminal voltage V1 allows the lithium ion battery 27 to be charged, while lowering the generated voltage VG below the terminal voltage V1 allows the lithium ion battery 27 to discharge. Moreover, the terminal voltage V1 of the lithium ion battery 27 is set higher than the terminal voltage V2 of the lead battery 28. This makes it possible to allow for charge and discharge of the lithium ion battery 27 with the ON/OFF switches SW1 and SW2 kept in the closed state. In other words, it is possible to allow the lithium ion battery 27 to discharge without electrically separating the lead battery 28 from the lithium ion battery 27, positively allowing for charge and discharge of the lithium ion battery 27 without complicating a circuit structure and switch control of the vehicle control apparatus 10. Hence, it is possible to enhance energy efficiency of the vehicle 11 and to reduce costs of the vehicle control apparatus 10.

As illustrated in FIG. 6, in allowing the motor generator 16 to generate power, it is possible to positively charge the lithium ion battery 27, while suppressing charge of the lead battery 28. Specifically, since the internal resistance of the lithium ion battery 27 is smaller than the internal resistance of the lead battery 28, it is possible to positively charge the lithium ion battery 27 while suppressing charge of the lead battery 28. Moreover, as illustrated in FIG. 7, in allowing the motor generator 16 to suspend power generation, it is possible to positively allow the lithium ion battery 27 to discharge, while suppressing discharge of the lead battery 28. Specifically, since the terminal voltage V1 of the lithium ion battery 27 is higher than the terminal voltage V2 of the lead battery 28, it is possible to positively allow the lithium ion battery 27 to discharge, while suppressing discharge of the lead battery 28. Such suppression of charge and discharge of the lead battery 28 makes it possible to relieve requests for output characteristics and cycle characteristics of the lead battery 28, leading to reduction in costs of the lead battery 28. From this viewpoint as well, it is possible to reduce costs of the vehicle control apparatus 10.

Note that, in the forgoing description, in lowering the generated voltage VG below the terminal voltage V1, the motor generator 16 may be controlled to the power generation suppression state. However, this is non-limiting. It is possible to allow the lithium ion battery 27 to discharge even when the generated voltage VG is lowered below the terminal voltage V1 while maintaining the power generation state of the motor generator 16. At this occasion, adjusting the generated current of the motor generator 16 may allow for control of the discharge current of the lithium ion battery 27. Specifically, increasing the generated current of the motor generator 16 may allow for a decrease in the discharge current of the lithium ion battery 27, while decreasing the generated current of the motor generator 16 may allow for an increase in the discharge current of the lithium ion battery 27.

[Engine Start Control]

Figure 8:
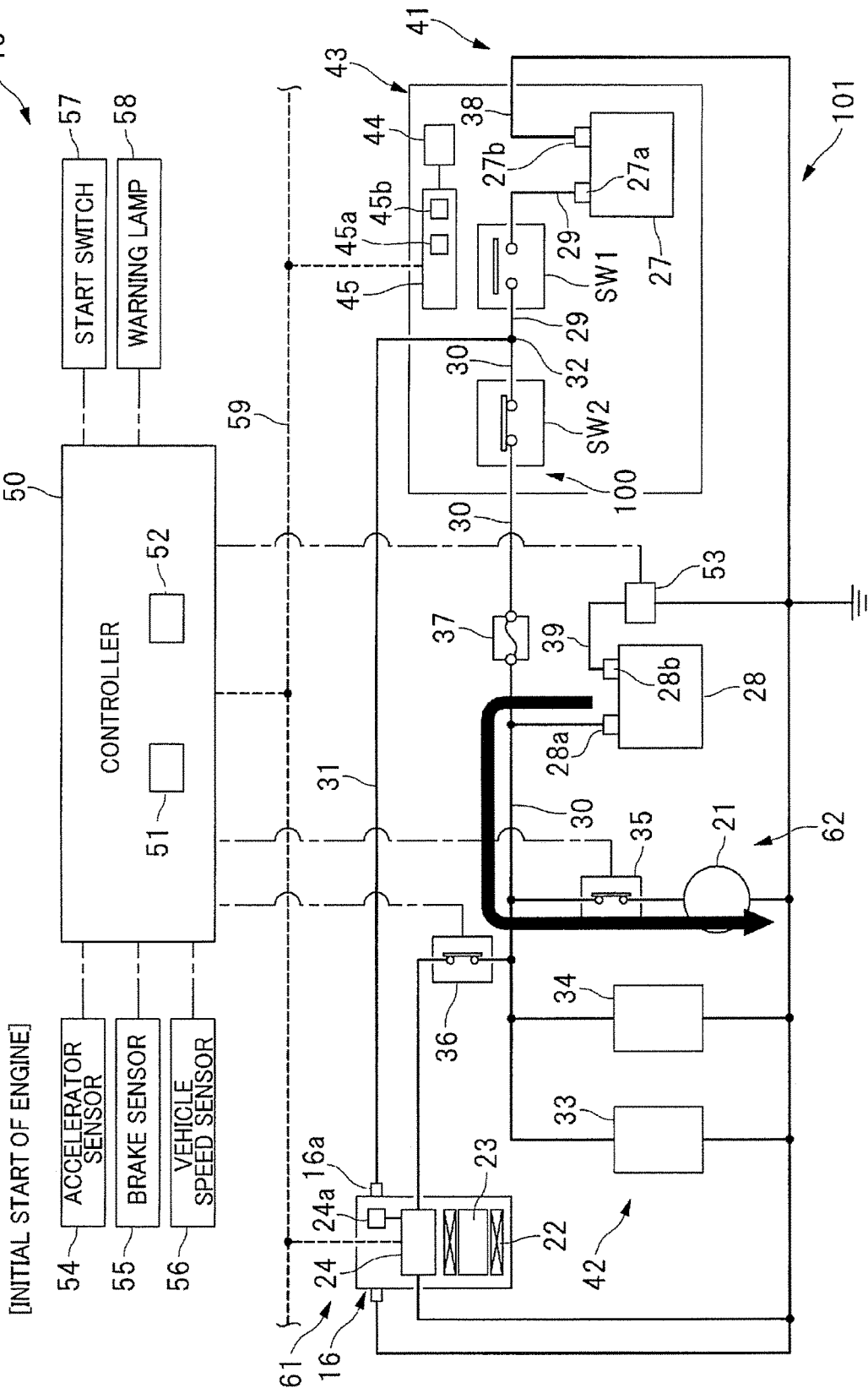
FIG. 8 illustrates a state of power supply of the vehicle control apparatus.
Figure 9:
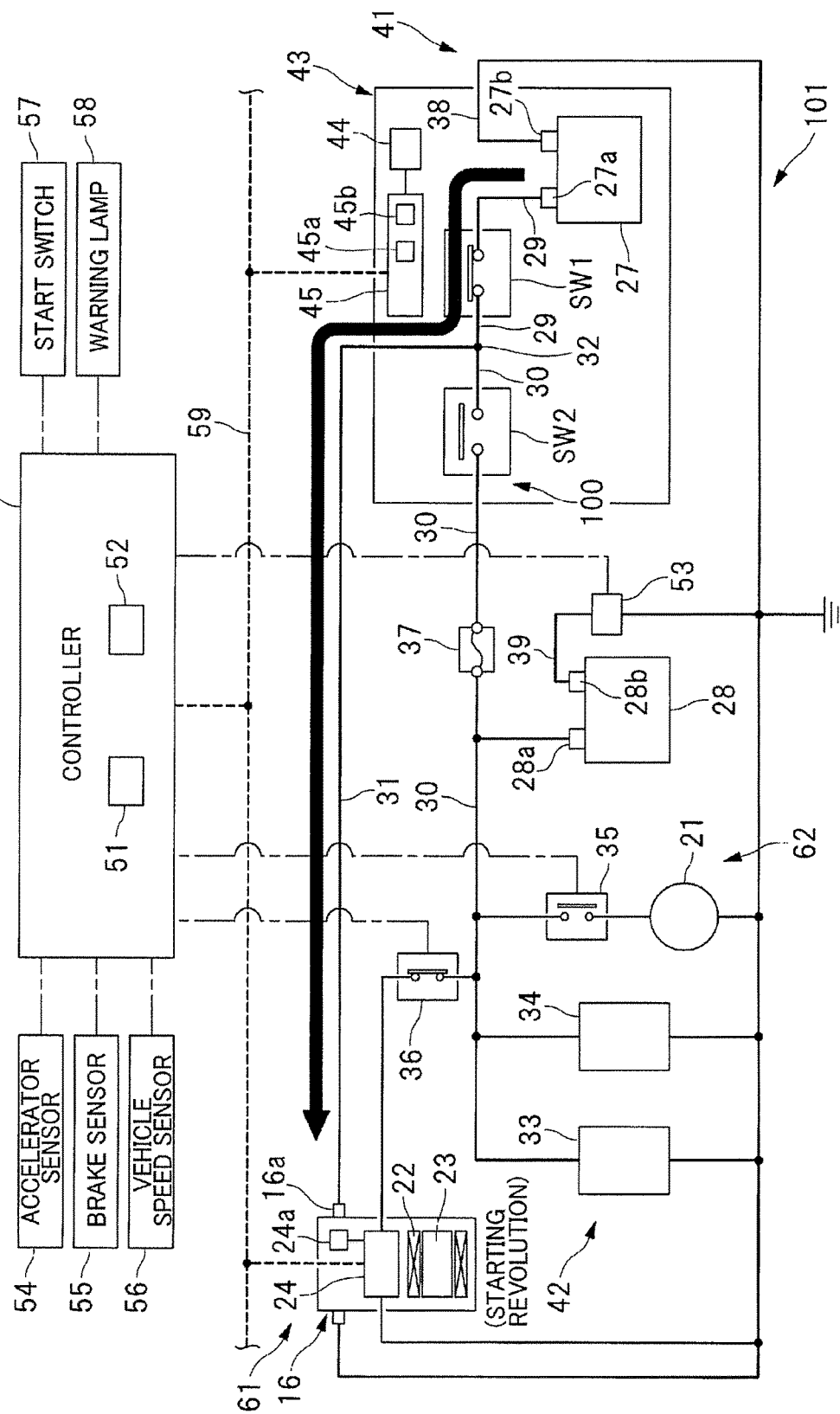
FIG. 9 illustrates a state of power supply of the vehicle control apparatus.

Description is given next of the power supply states of the vehicle power source 10 at engine start. FIGS. 8 and 9 illustrate the power supply states of the vehicle power source 10. FIG. 8 illustrates the power supply state at initial start of the engine by operation of the start switch. FIG. 9 illustrates the power supply state at engine restart by idling stop control.

Referring to FIG. 8, at the initial start of the engine by the operation of the start switch by a driver, the engine 12 may be started by the starter motor 21. The starter motor 21 may constitute a second starting system 62. The second starting system 62 may be constituted by the starter motor 21 and the lead battery 28 which is connected electrically thereto. Specifically, at the initial start of the engine by the operation of the start switch, the ON/OFF switch SW2 in the battery module 43 may be closed, and thereafter the starter relay 35 may be closed. This may cause power supply from the lead battery 28 to the starter motor 21, allowing the engine 12 to be started by cranking operation of the starter motor 21. Note that the ON/OFF switch SW1 in the battery module 43 may be closed after the engine 12 is started. In the forgoing description, the ON/OFF switch SW1 may be opened in view of suppression of discharge of the lithium ion battery 27. However, this is non-limiting. For example, under a low temperature environment such as, but not limited to, a very cold region, the ON/OFF switches SW1 and SW2 may be closed to allow the starter motor 21 to be supplied with power from both the lead battery 28 and the lithium ion battery 27.

Referring to FIG. 9, at the engine restart by the idling stop control, the engine 12 may be started by the motor generator 16. The motor-generator 16 may constitute a first starting system 61. The first starting system 61 may be constituted by the motor-generator 16 and the lithium ion battery 27 which is connected electrically thereto. Specifically, at the engine restart by the idling stop control, the ON/OFF switch SW2 in the battery module 43 may be opened, and thereafter a target drive torque of the motor generator 16 may be raised. This may cause power supply from the lithium ion battery 27 to the motor generator 16, allowing the engine 12 to be started by the cranking operation of the motor generator 16. At the engine restart by the idling stop control, the ON/OFF switch SW2 may be opened to electrically separate the first power circuit 41 from the second power circuit 42. This makes it possible to prevent an instantaneous voltage drop of the second power circuit 42 with respect to the instantaneous voltage drop protection load 33. Hence, it is possible to keep the instantaneous voltage drop protection load 33 in operation during the engine restart, leading to enhanced vehicle quality.

[Fail-Safe Control]

Next, the fail safe control executed by the vehicle control apparatus 10 will be described. As stated above, when the engine is restarted by idling stop control, power may be supplied from the lithium ion battery 27 to the motor generator 16, and the engine 12 may be started by a cranking operation of the motor generator 16. In this way, when restarting the engine by idling stop control, the engine 12 may be started by using the first starting system 61. Therefore, if an abnormality has occurred in the first starting system 61, then even if the starting conditions are established, it is difficult to restart the engine 12.

Figure 10:
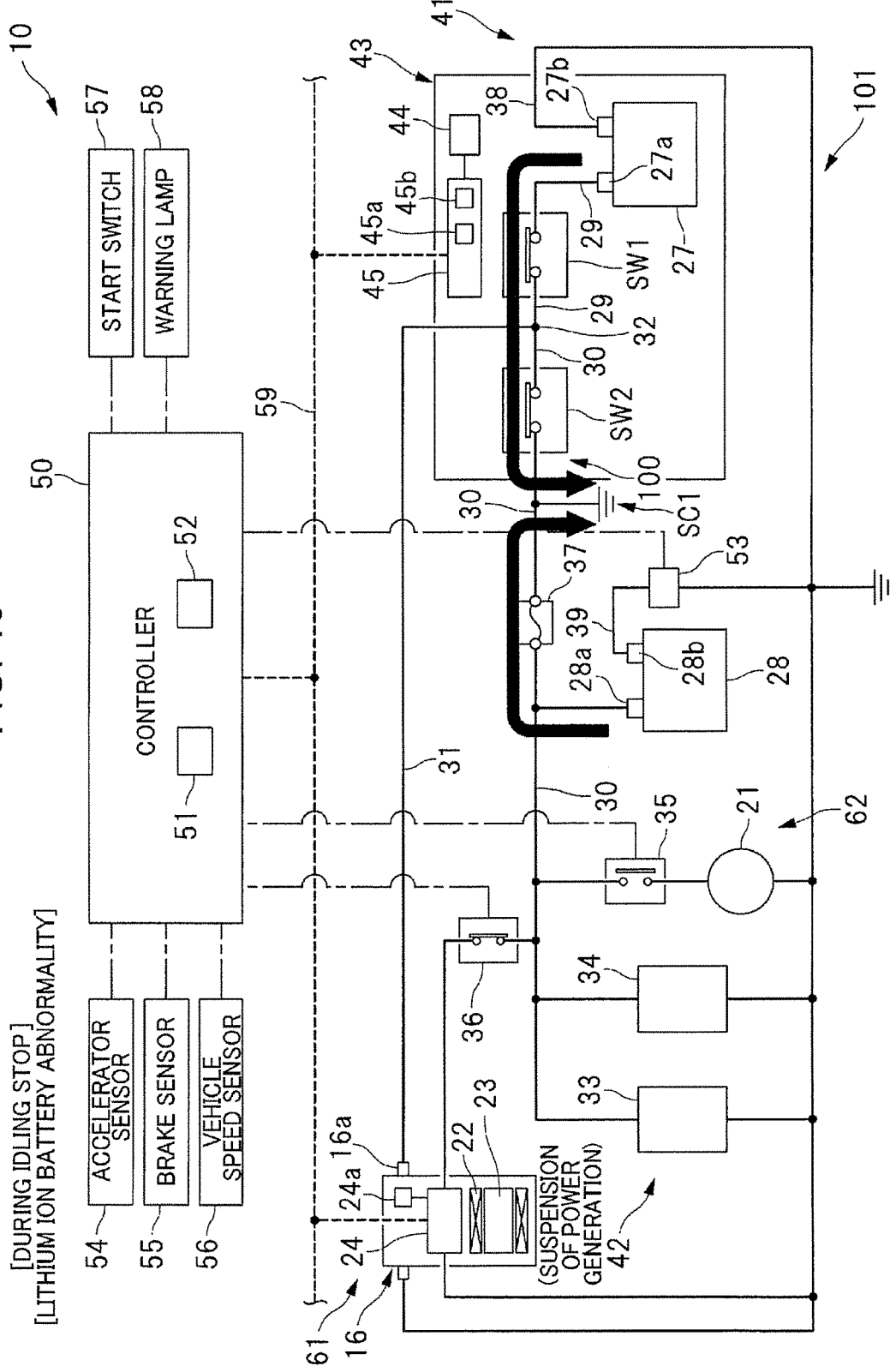
FIG. 10 illustrates an example of the occurrence of an abnormal state in a first starting system.
Figure 11:
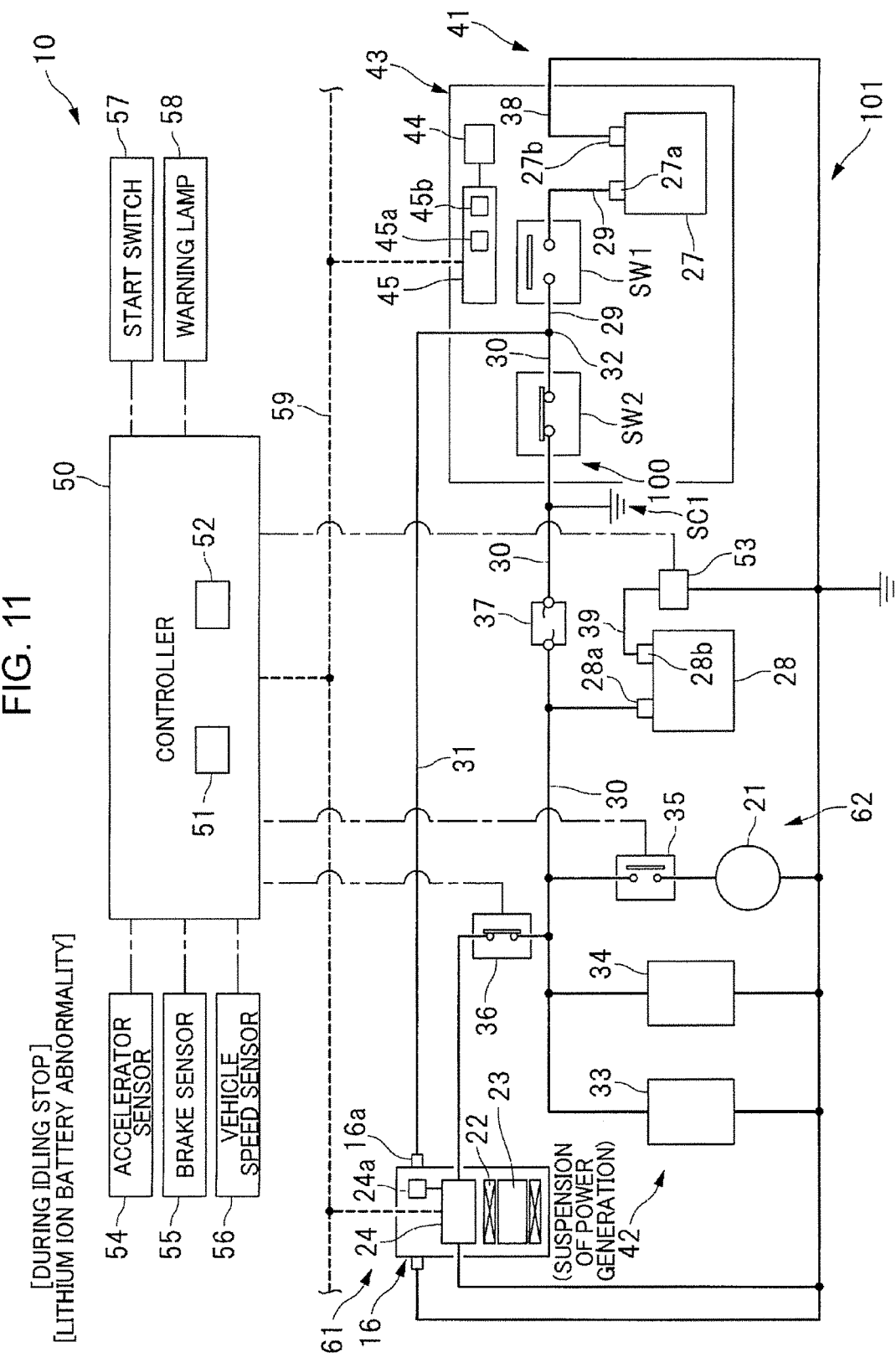
FIG. 11 illustrates an example of the occurrence of an abnormal state in a first starting system.
Figure 12:
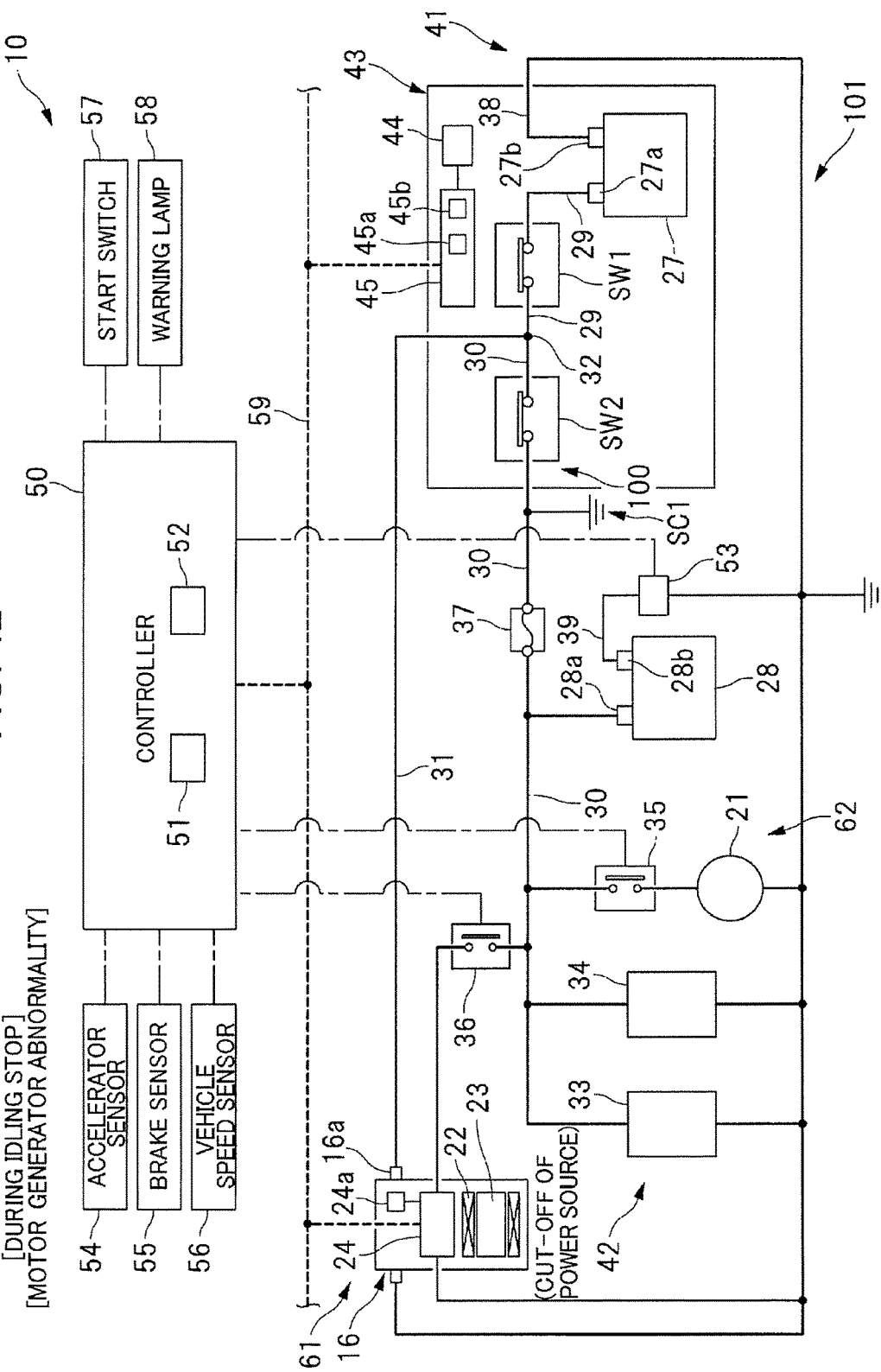
FIG. 12 illustrates an example of the occurrence of an abnormal state in a first starting system.

Here, FIG. 10 to FIG. 12 are illustrate examples of the occurrence of an abnormal state in the first starting system 61. Firstly, referring to FIG. 10, when short occurs in the power source line 30 which connects the on/off switch SW2 and the fuse 37, while the engine is stopped by idling stop control (hereinafter called "during an idling stop"), a large discharge current may flow from the lithium ion battery 27 and the lead battery 28 to the short site SC1. In this way, if a large current has flowed from the lithium ion battery 27 due to short of the power source line 30, or the like, then as illustrated in FIG. 11, the on/off switch SW1 is forcibly disconnected and discharging of the lithium ion battery 27 is stopped. In this case, since the cut-off state of the on/off switch SW1 continues, then power cannot be supplied from the lithium ion battery 27 to the motor generator 16 and it is difficult to restart the engine 12, even if the starting condition is established. Furthermore, as illustrated in FIG. 12, even if the ISG relay 36 is disconnected due to a fault, or the like, the power source of the motor generator 16, in other words, of the ISG controller 24 is disconnected. In this case, the motor generator 16 cannot be controlled and even if the starting condition is established, it is difficult to restart the engine 12.

FIG. 11 illustrates a state where the lithium ion battery 27 is unusable, and FIG. 12 illustrates a state where the motor generator 16 is undriveable, but the abnormalities of the first starting system 61 are not limited to the examples illustrated in FIG. 11 and FIG. 12. For example, an unusable state which is an abnormality of the lithium ion battery 27 may be a communication abnormality between the controllers, a disconnection of the on/off switch SW1 due to an increase in the temperature of the lithium ion battery 27, a disconnection of the power source of the battery controller 45, a failure of the battery controller 45, or the like. Furthermore, an undriveable state which is an abnormality of the motor generator 16 may be a communication abnormality between the controllers, or a failure of the ISG controller 24, or the like.

As described above, when an unusable state of the lithium ion battery 27 occurs, or when an undriveable state of the motor generator 16 occurs, it is difficult to restart the engine 12 even if the starting conditions are established. Therefore, the ISS controller 52 of the control unit 50 may execute the following fail safe control in order to restart the engine 12 when an abnormality occurs in the first starting system 61.

Figure 13:
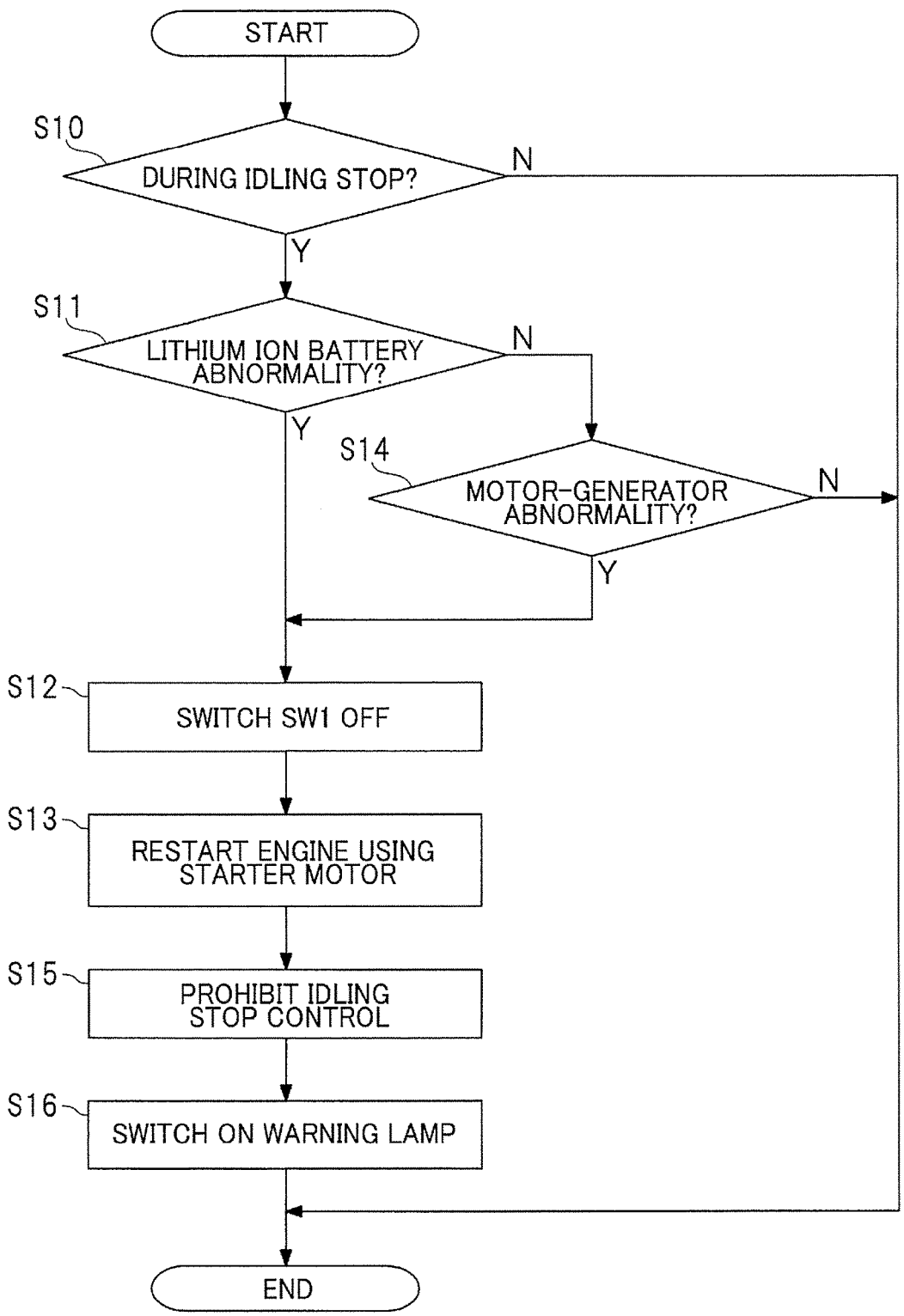
FIG. 13 is a flowchart of an example of a procedure of fail safe control.
Figure 14:
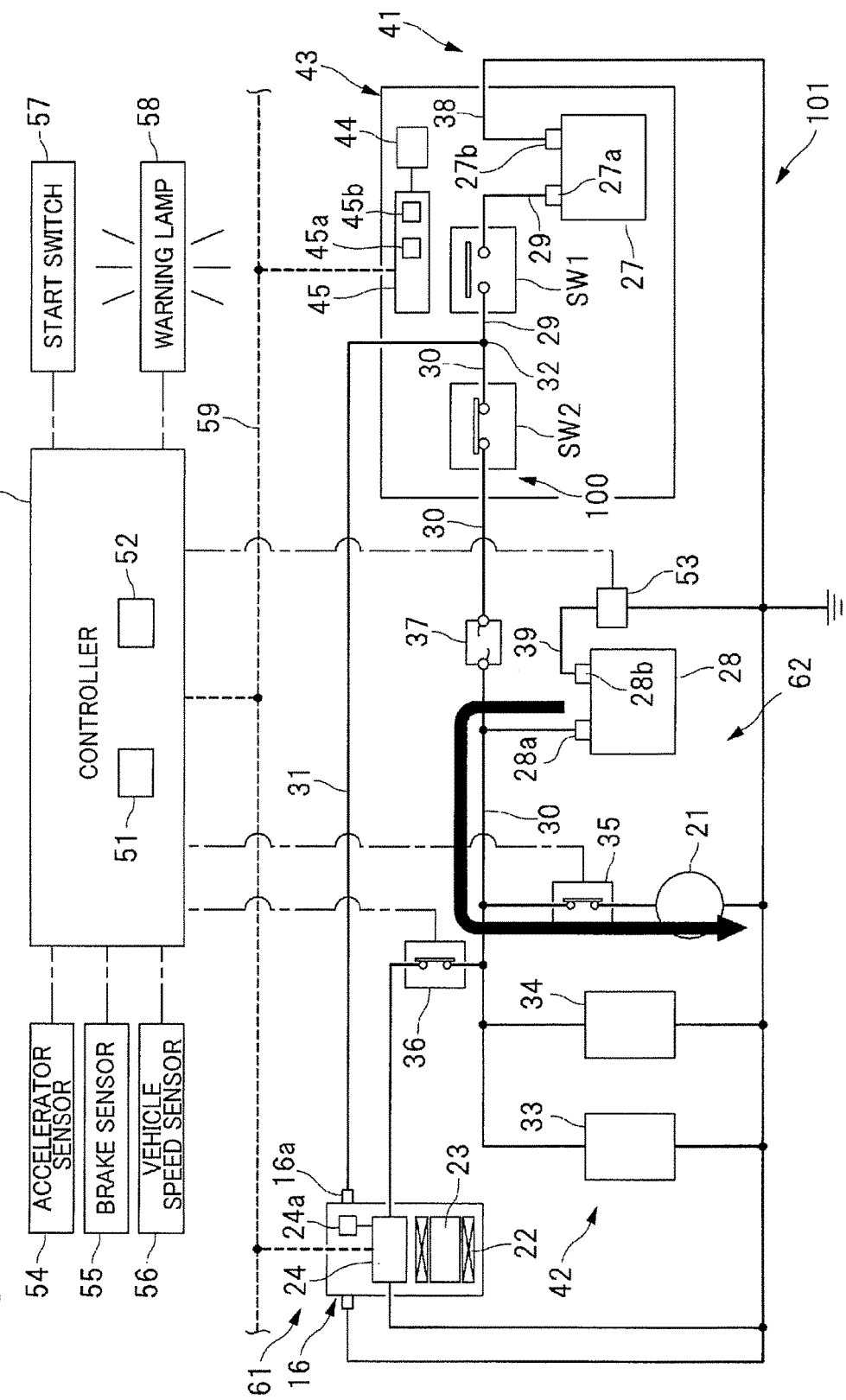
FIG. 14 illustrates engine a restart condition based on the fail safe control.

FIG. 13 is a flowchart of an example of a procedure of fail safe control, and FIG. 14 illustrates the engine restarting condition based on fail safe control. As illustrated in FIG. 13, in step S10, it may be determined whether or not an idling stop is in progress. In step S10, if it is determined that an idling stop is in progress, the flow may proceed to step S11. In step S11, determination may be made on whether or not the lithium ion battery 27 is in a unusable state. In step S11, if it is determined that the lithium ion battery 27 is in an unusable state, an abnormality occurs in the first starting system 61 and therefore the flow may proceed to step S12. In step S12, a cut-off signal for switching the on/off switch SW1 to the cut-off state may be output, and the on/off switch SW1 may be switched to a cut-off state (off state). After a cut-off signal has been output to the on/off switch SW1, the flow may proceed to step S13. In step S13, the engine 12 may be restarted by the starter motor 21.

On the other hand, in step S11, if it is determined that the lithium ion battery 27 is normal, the flow may proceed to to step S14. In step S14, it may be determined whether or not the motor generator 16 is in an undriveable state. If it is determined that the motor generator 16 is in an undriveable state, then an abnormality occurs in the first starting system 61 and therefore the flow may proceed to step S12. In step S12, a cut-off signal for switching the on/off switch SW1 to the cut-off state may be output, and the on/off switch SW1 may be switched to a cut-off state (off state). After a cut-off signal has been output to the on/off switch SW1, the flow may proceed to step S13. In step S13, the engine 12 may be restarted by the starter motor 21.

When the engine 12 is restarted in step S13, as illustrated in FIG. 14, a connection signal may be output to the starter relay 35 from the ISS controller 52 which has detected the abnormality in the first starting system 61, and the starter relay 35 may be switched to a connected state (on state). Consequently, power may be supplied from the lead battery 28 to the starter motor 21, and the engine 12 may be restarted by a cranking operation of the starter motor 21. When the engine 12 is restarted, the flow may proceed to step S15. In step S15, idling stop control of the engine 12 may be prohibited. In other words, since an abnormality has occurred in the first starting system 61, the engine 12 may be prohibited from stopping automatically based on the stop condition, and the engine 12 which has been restarted may continue in an operating state. Thereupon, the the flow may proceed to step S16. In step S16, the warning light 58 may be switched on in order to inform the occupant of the abnormality of the first starting system 61 or the prohibition of the idling stop control.

As described thus far, during an idling stop, if an abnormality occurs in the first starting system 61, the engine 12 may be restarted using the starter motor 21, in other words, the second starting system 62. Accordingly, even if an abnormality occurs in the first starting system 61, it is possible to start the engine 12 reliably and the travel performance of the vehicle 11 can be ensured. Furthermore, even if an abnormality occurs in the first starting system 61, the engine 12 may be restarted immediately using the second starting system 62, before the starting condition is established in the idling stop control. Consequently, it is possible to recover rapidly from a state where travel is not possible due to an abnormality in the first starting system 61, therefore the reliability of the fail safe control can be improved.

Furthermore, idling stop control may be prohibited after the engine 12 has been restarted using the second starting system 62. By prohibiting the engine stop based on the idling stop control, it is possible to eliminate unreliable factors which influence the travel of the vehicle, and therefore the various controls relating to the travel of the vehicle can be stabilized. Moreover, if an abnormality occurs in the first starting system 61, a cut-off signal may be output to the on/off switch SW1 before the engine 12 is restarted. Consequently, it is possible to disconnect the power supply to the first starting system 61 from the conduction line 31, and the engine 12 can be restarted in a stable fashion.

The technology is by no means limited to the implementations described above, and may be modified in variety of ways without departing from the scope of the subject matter of the technology. In the forgoing description, the ISS controller 52 may serve as the "engine controller". However, this is non-limiting and another controller may function as the "engine controller". Furthermore, the engine controller may also be configured by a plurality of controllers, rather than being configured by one controller. In the description given above, control signals, such as a connection signal or a cut-off signal, may be output from the control unit 50 when controlling the opening and closing of the on/off switches SW1, SW2, but this is non-limiting. For example, when controlling the on/off switches SW1, SW2, it is also possible to output control signals from the battery controller 45 or to output control signals from other controllers.

In the description give above, the lithium ion battery 27 may be adopted as the "first power storage", and the lead battery 28 may be adopted as the "second power storage". However, this is non-limiting. Any power storage may be adopted as the "first power storage" and the "second power storage". For example, a lead battery, a nickel hydrogen battery, an electric double layered capacitor, and other batteries or capacitors may be adopted as the "first power storage". A lithium ion battery, a nickel hydrogen battery, an electric double layered capacitor, and other batteries or capacitors may be adopted as the "second power storage". Furthermore, a same kind of power storage may be adopted as the "first power storage" and the "second power storage". Note that, in combined use of the lithium ion battery 27 and the lead battery 28, an iron phosphate lithium ion battery may be adopted for the lithium ion battery 27. An iron phosphate lithium ion battery includes iron phosphate lithium as a positive electrode material. In the forgoing description, the ON/OFF switch SW2 may be inserted in the second power line 30 that constitutes the conduction path 100. However, this is non-limiting. The ON/OFF switch SW2 may be inserted in the conduction line 39 that constitutes the conduction path 101. With the ON/OFF switch SW2 thus inserted in the conduction path 101, it is also possible to control a coupling state of the lead battery 28 to the power circuits. The ON/OFF switches SW1 and SW2 may be an electromagnetic switch that allows a contact to operate by an electromagnetic force, or a semiconductor switch that includes a semiconductor element.

In the description described above, when controlling the motor generator 16 to a state of power generation by combustion, the generation voltage VG may be pulled up to a prescribed voltage Va, and when controlling the motor generator 16 to a regenerative power generation state, the generation voltage VG may pulled up to a prescribed voltage Vb. However, this is non-limiting. For example, the target generation voltage of the motor generator 16 may be made the same in both the state of power generation by combustion and the regenerative power generation state. Furthermore, in the state of power generation by combustion or the regenerative power generation state, the target generation voltage of the motor generator 16 may be varied based on the vehicle speed, the accelerator operation amount, and the brake operation amount. Furthermore, in the description given above, the motor generator 16 which may serve as an electric generator and an electric motor may used. However, this is non-limiting. It is also possible to use an electric generator which does not function as an electric motor. It is also possible to employ an electric generator of another type for the motor generator 16, rather than being limited to an induction generator.

In the forgoing description, in the engine restart in the idling stop control, the motor generator 16 may be driven as an electric motor. However, this is non-limiting. For example, in acceleration traveling after the engine start, the motor generator 16 may be driven as an electric motor, allowing for reduction in a load on the engine 12. Furthermore, in the forgoing description, the vehicle body load 34 may be coupled to the first power circuit 41. However, this is non-limiting. The vehicle body load 34 may be coupled solely to the second power circuit 42, or may be coupled to both the first power circuit 41 and the second power circuit 42.

Although some preferred implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle control apparatus mounted on a vehicle, the vehicle control apparatus comprising:
   a first starting circuitry, including:
      a first electric motor coupled to an engine of the vehicle, and
      a first battery configured to be connected to the first electric motor and to supply electric power to the first electric motor;
   a second starting circuitry, including:
      a second electric motor coupled to the engine, and
      a second battery configured to be connected to the second electric motor and to supply electric power to the second electric motor;
   a switch configured to switch between the first starting circuitry and the second starting circuitry; and
   an engine controller programmed to cause the vehicle control apparatus to stop the engine when a stop condition to stop the engine is established and to restart the engine using the first starting circuitry when a start condition to restart the engine is established,
   wherein the engine controller is programmed to cause the vehicle control apparatus to restart the engine by switching, using the switch, from the first starting circuitry to the second starting circuitry before the start condition is established, when an abnormality occurs in the first starting circuitry in a state where the engine has been stopped under the stop condition.

2. The vehicle control apparatus according to claim 1, wherein
   the switch is provided in a conduction path that couples a positive electrode terminal of the first battery and a positive electrode terminal of the second battery, or in a conduction path that couples a negative electrode terminal of the first battery and a negative electrode terminal of the second battery, the switch being configured to switch between a conductive state and a cut-off state, the conductive state involving coupling of the first electric motor and the first battery, and the cut-off state involving separation of the first electric motor and the first battery.

3. The vehicle control apparatus according to claim 1, wherein the engine controller prohibits stop of the engine based on the stop condition when the engine is restarted using the second starting system.

4. The vehicle control apparatus according to claim 2, wherein the engine controller prohibits stop of the engine based on the stop condition when the engine is restarted using the second starting system.

5. The vehicle control apparatus according to claim 1, where the switch is configured to switch between a conductive state and a cut-off state, the conductive state involving coupling of the first electric motor and the first battery, and the cut-off state involving separation of the first electric motor and the first battery,
   wherein when the abnormality occurs in the first starting circuitry, the engine is restarted by using the second starting circuitry after a cut-off signal for switching the switch to the cut-off state has been output from the engine controller.

6. The vehicle control apparatus according to claim 5, wherein the switch is provided in a conduction path that couples a positive electrode terminal of the first battery and a positive electrode terminal of the second battery, or in a conduction path that couples a negative electrode terminal of the first battery and a negative electrode terminal of the second battery.

* * * * *